May 5, 1970 V. M. SINCLAIR ET AL 3,509,759

DETECTION OF LEAKS

Filed Feb. 23, 1968

United States Patent Office 3,509,759

Patented May 5, 1970

1

3,509,759

DETECTION OF LEAKS

Vivian Milby Sinclair, Thurso, Scotland, and John Leslie Phillips, Dorchester, England, assignors to United Kingdom Atomic Energy Authority, London, England Filed Feb. 23, 1968, Ser. No. 707,503
Claims priority, application Great Britain, Mar. 15, 1967, 12,255/67
Int. Cl. G01m *3/02;* G21c *17/08*
U.S. Cl. 73—52 4 Claims

ABSTRACT OF THE DISCLOSURE

To detect leaks in sealed containers which are subject to irradiation by neutrons in an environment of molten alkali metal, gold is included in the container adjacent the inner surfaces of the container walls. Leaks are detected by periodically removing a sample of the molten metal, concentrating the sample in respect to gold, and subjecting the concentrated sample to radiation measurement to determine if gold is present in said concentrated sample in an amount sufficient to indicate that a leak from said sealed container has occurred.

BACKGROUND OF THE INVENTION

The present invention relates to the detection of leaks in sealed containers which are subject to irradiation by neutrons in an environment of molten alkali metal. Such an environment pertains in liquid metal cooled reactors where the coolant is sodium or an alloy thereof with potassium.

Methods of leak detection have been extensively developed for the purpose of giving warning of the failure of sealed fuel element sheathing. Mainly, these methods make use of fission products as a source of radioactive tracer which becomes detectable on release into the coolant. Prior proposals not relying on a fissile content are also known. However, on the evidence at present known to us, those that are applicable in a liquid metal environment are characterised by the release of gaseous phase tracer which may possibly be the product of radioactive decay of a solid substance implanted in the container. Although such proposals lend themselves to leak detection where there is no fissile content in the container, the gaseous phase character of the released traces may not be appropriate to the remainder of the plant. This may well be the case in a reactor where a blanket gas maintained over the liquid metal coolant is circulated continuously through a clean-up system.

SUMMARY OF THE INVENTION

A primary object of the invention is therefore to provide a detection method which does not rely on fissile material as a source of tracer and which employs instead an implanted solid substance for supplying a tracer which is soluble in the molten alkali metal. Accordingly, the invention is characterised, in one of its aspects, by the steps of providing said sealed container having gold within the container adjacent the inner surfaces of the container walls, periodically removing a sample of the molten metal, concentrating the sample in respect to gold, and subjecting the concentrated sample to radiation measurement to determine if gold is present in said concentrated sample in an amount sufficient to indicate that a leak from said sealed container has occurred.

In another of its aspects the invention provides a sealed container designed for service under irradiation by neutrons in an environment of moten alkali metal, which container includes gold adjacent the inner surfaces of the container walls. The placing adjacent the inner surfaces of the walls is to ensure that at least some of the gold is accessible to inleaking molten metal.

The following advantages have been established for use of gold in accordance with the invention:

(i) It is readily soluble in moten alkali metals.

(ii) It can easily be made into forms suitable for implantation.

(iii) It forms a readily identifiable isotope, i.e. gold 198, on neutron irradiation.

(iv) It forms an istotope of such a half life as to afford a leak detection technique of such sensitivity that further irradiation in an auxiliary source of neutrons is unnecessary.

(v) It is readily separable from the bulk of the alkali metal by distillation, and from fission products, corrosion products, and other major impurities in the residue after distillation, by extraction into an ethyl acetate solvent, followed by precipitation with hydroquinone.

A very small trace of gold impurity may have to be anticipated in the molten metal. Based on experience with grades supplied for use in nuclear reactors it is estimated that the unambiguous indication of a leak would require a transfer of gold from the container to the molten metal to give an equivalent level greater than $10^{-3}$ p.p.m. by weight of gold in the total mass metal. Generally the aim should be to achieve $2\times10^{-3}$ p.p.m. by weight. A figure such as this determines the amount of gold required in each container. It should be noted, however, that such a determination will also depend on such factors as the percentage of the gold addition per container that will be accessible to molten metal in the event of a leak, the magnitude of the neutron flux and hence the equilibrium activity of the gold, the time involved in sampling and analysis, and the extent of outleakage at which a leak indication is called for.

Since the invention does not rely on a fissile content, it lends itself particularly to sealed containers which do not contain nuclear fuel. In this category are graphite-containing components of a liquid metal cooled reactor. It may be necessary that such components are disposed in the liquid metal when serving in the role of neutron reflector or shielding. In this case the graphite is usually in sealed containers to avoid transport of carbon into the liquid metal coolant. Wtih stainless steel sheathing on the fuel elements, any addition of carbon to the coolant will cause carburisation of the sheathing. Since carburisation rate is temperature dependent, the fuel element sheathing stands to be preferentially carburised by added carbon but nevertheless some attack on pipework and particularly on heat exchangers at their hot ends would have to be expected. The latter items could in fact be the more seriously affected because the fuel elements have to be replaced periodically and are therefore not required to operate for so long. It is therefore desirable that any souce of carbon contamination of the liquid metal in the reactor be quickly detected.

Thus, in one particular embodiment of the invention, a body of graphite sealed within a can for use as shielding or reflector in a liquid metal cooled reactor has gold interposed between the graphite body and the can. It is usual to provide a growth accommodating gap between the body and the can. The inclusion of the gold can then be made on the basis that the gap will give inleaking coolant access to the gold almost regardless of where the gold and the leak are situated. Accordingly, it may be considered appropriate to include the gold in a lumped manner, e.g. in the form of a wire or wires. Especially if the gap is not provided, or is likely to close in service, the alternative is available of spreading the gold as a substantially continuous interlayer. Such an interlayer can be introduced in many different ways of which the following are examples: Electroplating on the inside surface of the can, flame spraying on the graphite, and introduction as a foil, preferably a composite one formed by rolled gold carried on a thin nickel foil. The gold may of course be in an alloy. The use of an interlayer may be based on incomplete access of inleakage to all the added gold and therefore more gold would be needed for a given size of unit than if the assumption is made that a gap will always be available for ensuring that access will be substantially complete. In so far as gap closure in service will depend on integrated flux magnitude, different forms and/or amounts of the gold may be desirable according to the position which the unit is to occupy in service.

An example of a preferred embodiment will now be described with reference to the accompanying drawings.

DESCRIPTION OF THE PREFERRED EMBODIMENT

Figure 1:
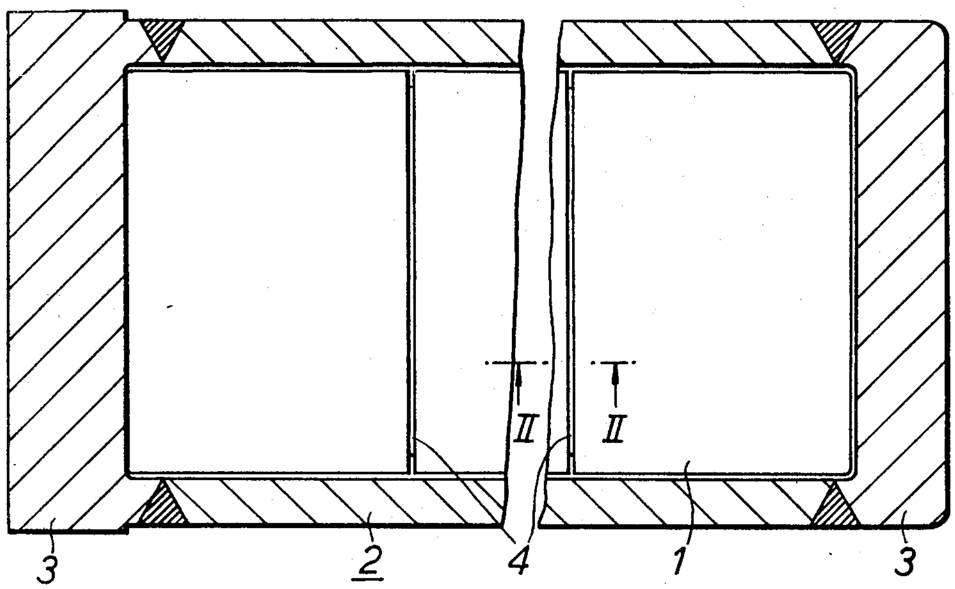
FIG. 1 is a side view, partly section.
Figure 2:
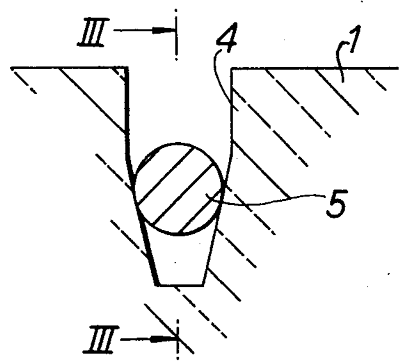
FIG. 2 is a fragmentary section on the line II—II of FIG. 1, to a larger scale.
Figure 3:
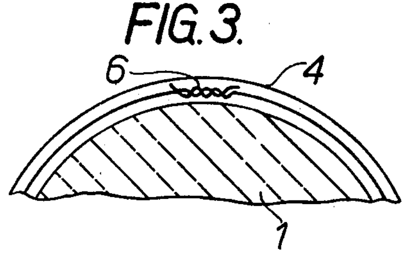
FIG. 3 is a fragmentary section on the line III—III of FIG. 2 but to the same scale as FIG. 1.

In FIG. 1 of the drawings is shown a cylindrical graphite body 1 sealed in a steel container 2 provided with end caps 3. The graphite body has grooves 4 at intervals along its length, the grooves encircling the body. The shape of the grooves 4 is shown more clearly in FIG. 2. Within each of the grooves 4 is a gold wire 5 (omitted from FIG. 1 but shown in FIGS. 2 and 3) with the ends of the wire twisted together to make a joint at 6.

We claim:

1. A sealed container designed for service under irradiation by neutrons in an environment of molten alkali metal, which container has a body of graphite sealed within it and includes gold adjacent the inner surfaces of the container walls.

2. A sealed container as claimed in claim 1 wherein the gold is in the form of wire or wires about the graphite body.

3. A sealed container as claimed in claim 1 wherein the gold is spread over the graphite body as a substantially continuous interlayer.

4. A method for the detection of leaks in sealed containers which are subjected to irradiation by neutrons in an environment of molten alkali metal which comprises providing said sealed container having gold within the container adjacent the inner surfaces of the container walls, periodically removing a sample of the molten metal, concentrating the sample in respect to gold, and subjecting the concentrated sample to radiation measurement to determine if gold is present in said concentrated sample in an amount sufficient to indicate that a leak from said sealed container has occurred.

References Cited

UNITED STATES PATENTS

| | | | |
|---|---|---|---|
| 209,002 | 10/1878 | Williams ___________ | 206—63.5 |
| 2,714,577 | 8/1955 | Fermi et al. _______ | 176—80 XR |

FOREIGN PATENTS

| | | |
|---|---|---|
| 869,645 | 6/1961 | Great Britain. |

S. CLEMENT SWISHER, Primary Examiner

U.S. Cl. X.R.

176—19